United States Patent
Stromqvist et al.

(10) Patent No.: US 7,644,190 B2
(45) Date of Patent: Jan. 5, 2010

(54) METHOD AND APPARATUS FOR PIPELINED PROCESSING OF DATA PACKETS

(75) Inventors: Thomas Stromqvist, Solna (SE); Gunnar Nordmark, Danderyd (SE); Lars-Olof Svensson, Stockholm (SE)

(73) Assignee: Xelerated AB, Stockholm (SE)

( * ) Notice: Subject to any disclaimer, the term of this patent is extended or adjusted under 35 U.S.C. 154(b) by 873 days.

(21) Appl. No.: 10/521,198

(22) PCT Filed: Jul. 9, 2003

(86) PCT No.: PCT/SE03/01197

§ 371 (c)(1), (2), (4) Date: Aug. 12, 2005

(87) PCT Pub. No.: WO2004/010288

PCT Pub. Date: Jan. 29, 2004

(65) Prior Publication Data

US 2006/0129718 A1    Jun. 15, 2006

Related U.S. Application Data

(60) Provisional application No. 60/398,756, filed on Sep. 5, 2002.

(30) Foreign Application Priority Data

Jul. 19, 2002    (SE) .................................... 0202276

(51) Int. Cl.
*G06F 3/00* (2006.01)
(52) U.S. Cl. ............................................. 710/5; 710/52
(58) Field of Classification Search ........................ None
See application file for complete search history.

(56) References Cited

U.S. PATENT DOCUMENTS

| | | | | |
|---|---|---|---|---|
| 4,052,670 | A | * | 10/1977 | Watanabe et al. ............ 370/324 |
| 6,049,816 | A | | 4/2000 | Kim et al. |
| 6,389,479 | B1 | | 5/2002 | Boucher et al. |
| 6,418,497 | B1 | | 7/2002 | Guthrie et al. |
| 6,463,472 | B1 | * | 10/2002 | Van Loo ...................... 709/224 |
| 6,912,608 | B2 | * | 6/2005 | Wolff et al. ................... 710/100 |
| 2002/0083298 | A1 | | 6/2002 | Cook et al. |

FOREIGN PATENT DOCUMENTS

| | | |
|---|---|---|
| EP | 1158726 A2 | 11/2001 |
| WO | WO 0161469 A2 | 8/2001 |
| WO | WO 02096043 A1 | 11/2002 |

* cited by examiner

*Primary Examiner*—Eron J Sorrell
(74) *Attorney, Agent, or Firm*—Young & Thompson

(57) ABSTRACT

The present invention relates to a method and apparatus for pipelined processing of data packets. A pipeline in a processor comprises an access point providing simultaneous access to one or more devices, said devices mainly for data processing operations not provided by the pipeline. The access point comprises at least one FIFO store for storing data entering the access point, a response FIFO store for storing responses received from the device(s), and a synchronization mechanism adapted to synchronize the fetching of the first entry in the FIFO store(s) and the first entry in the response FIFO store. The synchronization mechanism could advantageously be a fixed time delay mechanism. When the fixed time initiated by the fixed time delay mechanism has elapsed, the first response in the response FIFO store is merged into the data stored in the first entry in the FIFO store(s) for storing data entering the access point.

23 Claims, 8 Drawing Sheets

Fig. 3
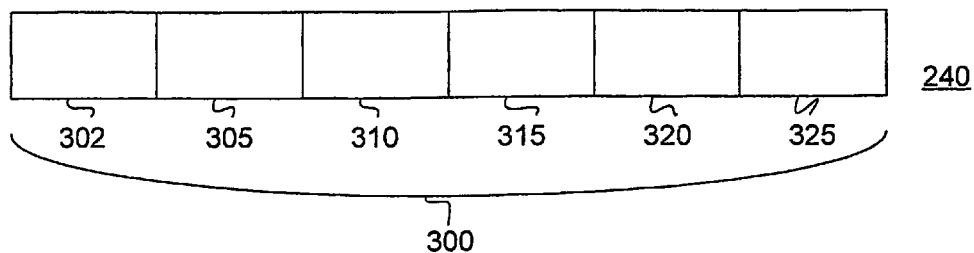
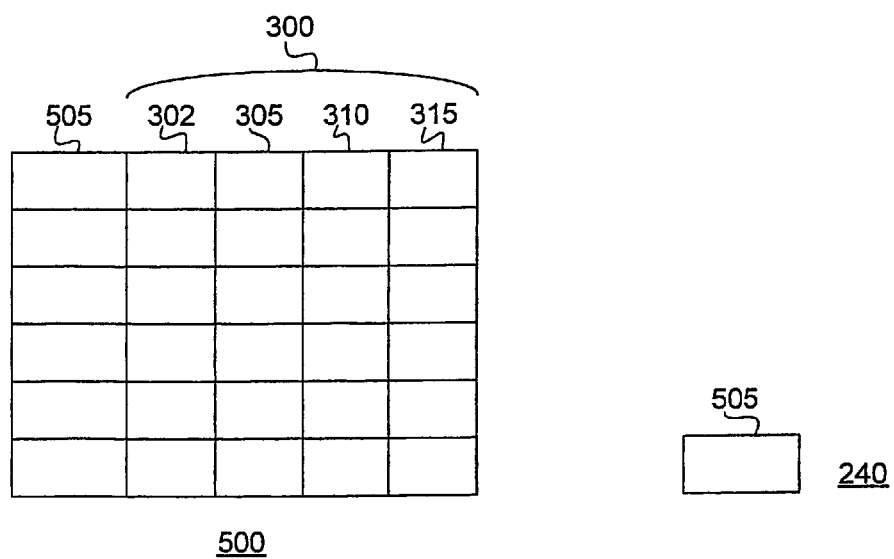
Fig. 5a          Fig. 5b

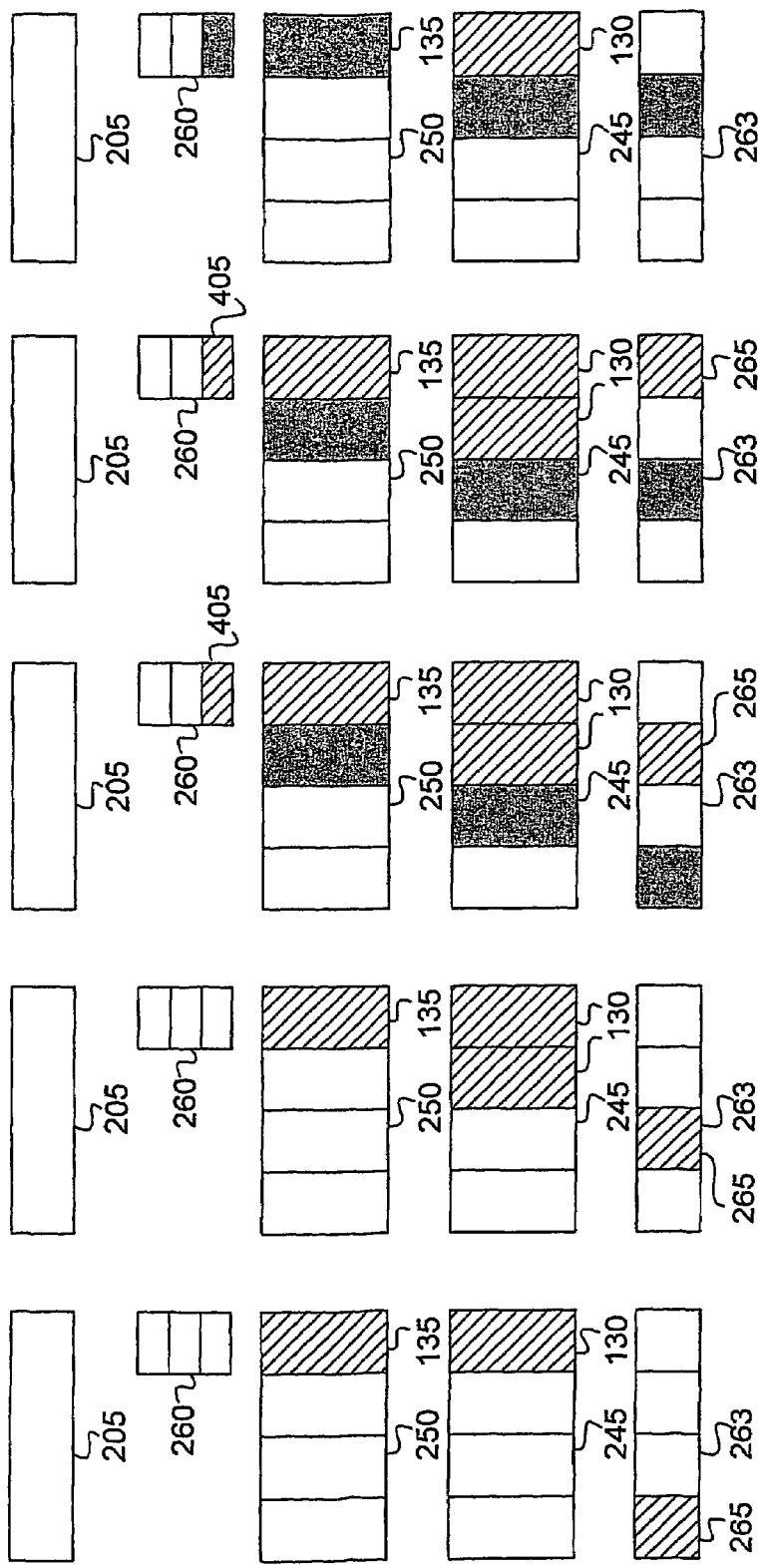

METHOD AND APPARATUS FOR PIPELINED PROCESSING OF DATA PACKETS

CROSS REFERENCE TO RELATED APPLICATIONS

This application is a national stage application of International Application PCT/SE03/001197, filed Jul. 9, 2003, designating the United States of America, which claims the benefit of Swedish Application No. 0202276-2, filed Jul. 19, 2002 and Provisional Application No. 60/398,756, filed Sep. 5, 2002.

FIELD OF THE INVENTION

The present invention relates to data processing in general, and more particularly to a method and apparatus for pipelined processing of data.

BACKGROUND

A processor which uses a pipelined processing technique and which receives a stream of data to be operated upon by the processor can be divided into segments referred to as processing stages, each processing stage being capable of executing operations on data. The processing stages make up a processing pipeline. Several data packets may simultaneously be present in the processing pipeline, being operated upon by different processing stages, and being brought forward to the next processing stage in the pipeline as time flows. Each processing stage can execute operations on the data present in the processing stage. Upon each clock tick, data is passed onto the subsequent stage by loading registers that are located between the previous and the subsequent processing stages. The data thus becomes present in the subsequent stage.

SUMMARY

A problem to which the present invention relates is how to improve the possibilities of utilising pipelined processing of data.

This problem is addressed by a processing means for pipelined processing of data packets, said processing means comprising an input, an output and a pipeline comprising at least one processing stage. The pipeline is connected between the input and the output. The processing means further comprises at least one access point providing access to a device. Said device is connected to the access point via a request channel which comprises a transmit connection for transmitting requests to the device and a receive connection for receiving responses from the device. The access point comprises at least one FIFO store for storing data entering the access point, a response FIFO store connected to the device via the receive connection for storing responses received on the receive connection, and a synchronisation mechanism adapted to synchronise the fetching of the first entry in said at least one FIFO store and the first entry in said response FIFO store.

The problem is further addressed by a method of pipelined processing of a data packet in a processing means comprising a pipeline. The pipeline comprises at least one processing stage. At least part of the data packet is received in an access point of the pipeline. The at least part of the data packet and any additional information associated with the data packet is stored in at least one FIFO store. A request is transmitted from the access point to a device on a transmit connection. A response, corresponding to said request, is then received in said access from the device on a receive connection and stored in a response FIFO store connected to said device via a receive connection. The first response in said first response FIFO store and the first entries in said at least one FIFO store are then extracted. The response is then merged into the data packet and/or into additional information associated with the data packet.

By the inventive method and processing means is achieved that data processing functionalities that are less suitable for integration in the processing stages can be provided by the processing means via devices that can be accessed from the pipeline. Such operations could e.g. be operations that require expensive hardware or software, space-consuming hardware, functionalities that are especially time-consuming, or operations that are seldom performed. The design of the processing stages can therefore be focused upon operations for which the processing stages are suitable, and the processing stages can be made cheaper, smaller and more efficient. Furthermore, resources can be saved since a device may be used by more than one access point. The synchronisation mechanism assures that a response received from a device is associated with the correct data packet.

In one embodiment of the inventive processing means, an access point can provide simultaneous access to more than one device via more than one request channels. In the inventive method, more than one request can be transmitted simultaneously from the access point on more than one transmit connection, where each transmit connection is connected to a different device hereby is achieved that the data packet, and/or the additional information associated with the data packet, can simultaneously be processed by different devices.

In one embodiment of the inventive processing means, the access point further comprises means for merging relevant parts of said responses into said data packet and/or into said additional information. Hereby is achieved that a device can be used for processes which alter the data packet and/or the additional information.

In one embodiment of the inventive processing means, the synchronisation mechanism is a fixed time delay mechanism adapted to initiate a fixed time delay upon entry of at least part of a data packet into the access point. In the inventive method, a fixed time delay is initiated and said extraction of said first response and first entries is performed in responsive to the elapse of said fixed time delay. Hereby is achieved that the distribution of data packets may be maintained and that jitter may be avoided. In one aspect of this embodiment, the fixed time delay is equal to or longer than the time required to process the most time consuming operation provided to access point by any of the devices. Hereby is achieved that the risk of the data block being further processed before a response has been received by from the device(s) is eliminated. In another aspect of this embodiment, the fixed time delay mechanism is adapted to transmitting a triggering signal when the initiated fixed time delay has elapsed. In the corresponding aspect of the inventive method, a triggering signal is generated when the fixed time delay has elapsed, and the step of extracting is performed responsive to said triggering signal. Hereby is achieved that the synchronisation of the extraction of the response, the data packet and additional information is facilitated. In another embodiment of the inventive processing means, the synchronisation mechanism is completion driven conditional logic adapted to determine whether all relevant response FIFO store(s) have data in the first entry.

In an embodiment of the inventive processing means wherein the access point provides simultaneous access to more than one device, each of the receive connections of said dedicated request channels is preferably connected to a different response FIFO store. Hereby is achieved that the processing time of operations provided to an access point by the same device may vary between different operations without risking that the responses are mixed up. Furthermore, having different response FIFO stores connected to different devices facilitates for the number of operations invoked from the same access point to vary between the processing of different data packets. Hence, all devices connected to an access point do not have to be used in the processing of each data packet.

In one aspect of the inventive processing means, the transmit connection is connected to an access unit of said access point. The access unit is adapted to receiving data processing information associated with said data packet, to using said data processing information in creating a request and to transmitting the request to said device on said transmit connection. Hereby is achieved that a request may be customised for a data packet. In one aspect of this embodiment, the data processing information comprises information related to the handling of a response received from the device(s), and the access unit comprises an access unit FIFO store for storing information relating to handling of a response. Hereby is achieved that altering the response handling on a per packet basis is facilitated. Suitably, the fixed time delay mechanism can be adapted to sending said triggering signal at least to the access unit, the access unit being adapted to fetching a response in the response FIFO store responsive to said triggering signal. Hereby is achieved that said access unit knows when said response is available for further processing. In an aspect of this embodiment wherein the access point provides simultaneous access to more than one device, each transmit connection is preferably connected to an access unit. Hereby is achieved that one request can be customised for each data packet.

In one embodiment of the inventive method, data processing information associated with the data packet is extracted prior to the transmitting of the request. The extraction of data processing information is suitably performed by use of an access point reference in the additional information. The request can then be prepared according to said data processing information, and the merging of the response into the data packet and/or additional information can be performed according to said data processing information. Hereby is achieved that a request may be customised for a data packet.

In one aspect of this embodiment, the extraction of data processing information is performed by extracting a driver identifier from the access point reference and looking up said driver identifier in a driver table, the driver identifier being associated with data processing information in said driver table. The access point of the inventive processing means may comprise a driver table comprising data processing information entries and associated driver identifier entries, and the access point may be adapted to receiving a driver identifier and to extracting, via said driver identifier, data processing information from the driver table. Hereby is achieved that the processing resources in the processing stages that are used for obtaining the access point reference can be reduced. Furthermore, an abstraction layer is introduced to the access point, so that the values of data processing information can be altered without changing the operation of the processing stages. The data processing information corresponding to a value of the driver identifier in the driver table can be altered, e.g. during configuration of the access point. Hence, the exchange of a device to a different device, or the change of operations for which a device can be used by access point, is facilitated.

In one embodiment of the inventive processing means, the processing means comprises at least one switch being connected between at least one transmit connection and at least two devices, said switch being configurable to provide access to any one of said devices via any of said transmit connections. Hereby is achieved that a transmit connection may provide access to different devices at different times. Furthermore, a device may easily be accessed from different access points.

BRIEF DESCRIPTION OF THE DRAWINGS

The present invention will now be discussed in more detail with reference to preferred embodiments of the present invention, given only by way of example, and illustrated in the accompanying drawings, in which:

FIG. 3 is an illustration of an access point reference comprising data processing information.

FIG. 5a is an example of a driver table comprising driver identifier entries and corresponding data processing information entries.

FIG. 5b illustrates an access point reference comprising a driver identifier.

FIGS. 6a-e is an illustration of a data packet flowing through an access point.

DETAILED DESCRIPTION

Figure 1:
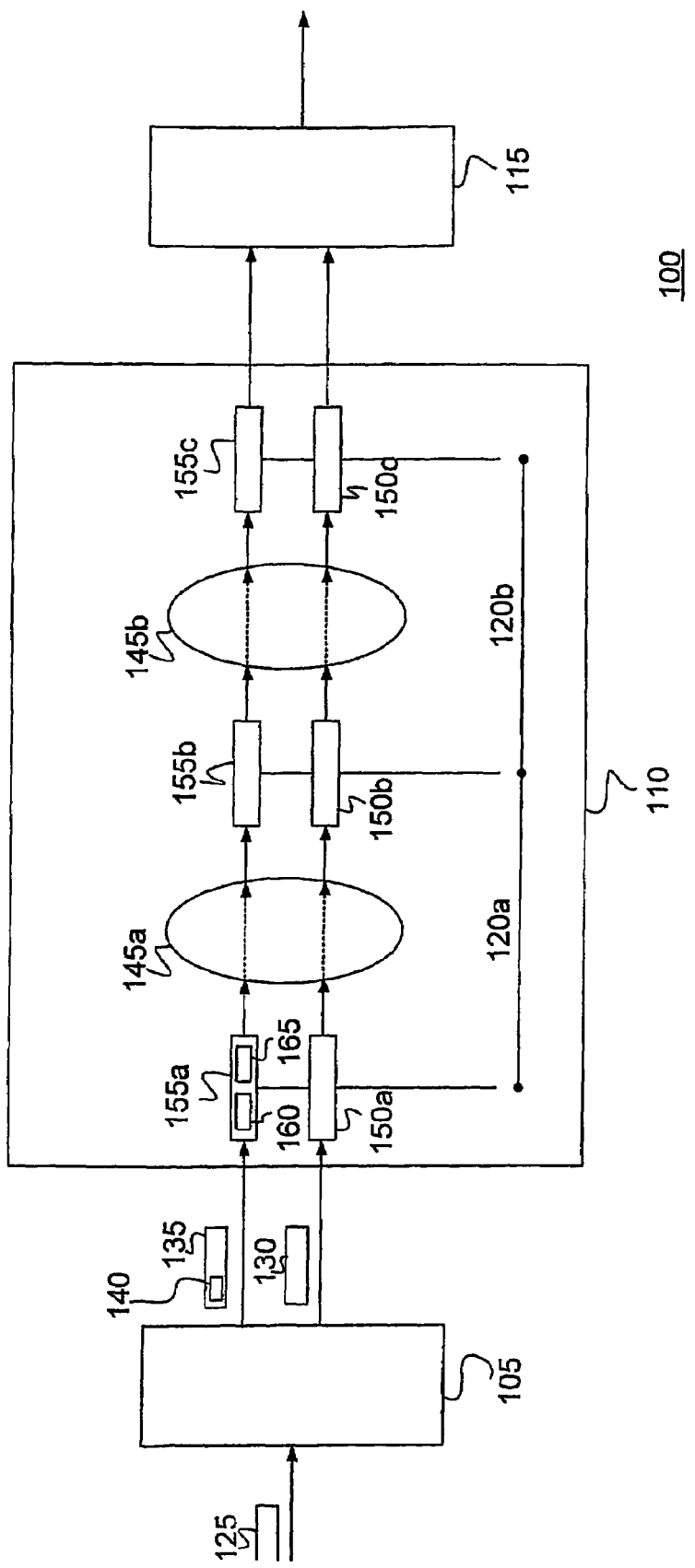
FIG. 1 is a schematic drawing of a processor operating according to a pipelined processing technique.

In FIG. 1, an example of a processor 100 operating according to a pipelined processing technique is illustrated. Processor 100 comprises an input 105, a pipeline 110 and an output 115. Input 105 could e.g. be a receiver and output 115 could be a transmitter, or input 105 and output 115 could be of simpler design. Pipeline 110 of FIG. 1 comprises two processing stages 120a and 120b. Obviously, a pipeline 110 may comprise any number of processing stages 120. When a data packet 125 enters processor 100, input 105 may, if the data packet 125 is large or small compared to the available bit-width in pipeline 110, re-arrange data packet 125 into one or more data blocks 130. A data block 130 may comprise one or several data packets 125, or parts of a data packet 125. Input 105 may furthermore associate additional information 135 to data packet 125. Additional information 135 may e.g. comprise information about which instructions should be executed on data packet 125 in pipeline 110 (see Swedish patent application 0100221-1, filed by the applicant and hereby incorporated by reference). Data block 130 and additional information 135 are passed from input 105 to pipeline 110, in which the additional information 135, as well as the data block 130, may or may not be operated upon. The processing stages 120a and 120b comprise logic units 145a and 145b, respectively, in which the operation on data is performed. A data block 130 can be operated upon by a logic unit 145 of a processing stage 120 during the time that elapses between two clock ticks. Upon the next clock tick, data block 130 and additional information 135 are forwarded to the next processing stage 120, via a data block register 150 and an additional register 155. Additional register 155 could advantageously comprise a general purpose register 160 and a special purpose register 165. The general purpose register could preferably be used for storage of the part of additional information 135 that should be easily accessible, while special purpose register 165 could preferably be used for storage of the part of additional information 135 that is only used by certain parts of the pipeline 110. Each processing stage 120 should preferably have access to a data block register 150 and an additional register 155 for retrieving data that should be operated upon by processing stage 120, and another data block register 150 and additional register 155 for storing data that has been operated upon by processing stage 150. Two adjacent processing stages 120 hence share a data block register 150 and an additional register 155.

In pipeline 110, a data block 130 can be processed upon by a logic unit 145 of a processing stage 120 during one clock tick. In order to simplify the construction and programming of the processing stages 120, the processing stages 120 should preferably be identical and each processing stage 120 should preferably provide the same functionality. When designing processing stages 120 that are to be included in a pipeline 110, one should preferably consider which functionalities are often used in pipeline 110, and, if feasible, include them in each processing stage 120. When the processor 100 is used in e.g. a router, such functionalities may be forwarding, encapsulating and decapsulating of data packets. To include functionalities which are rarely used in each processing stage 120, or which require a lot of hardware and/or complicated software, is often too expensive and/or space consuming. Examples of such functionalities may in a router be packet filtering, traffic conditioning and counting of packets.

A solution to the problem of how to include rarely used or hardware/software-consuming functionalities in a processor 100 operating according to a pipelined processing technique is to connect one or more devices, external to pipeline 110, to one or more points in the pipeline 110. Such a device could be a hard-coded device, a programmable device, a memory, or any other device that can be used in the processing of data, and may be referred to as a co-processor or an engine. The device can be part of processor 100, or be external to processor 100. A functionality that is not included in processing stages 120 can then be included in one or several devices. Time-consuming functionalities can also suitably be introduced to a processor 100 via such devices. The queuing of data while a time-consuming operation is performed in a device could then e.g. be done in memories. If the time-consuming operation were to be carried out in the pipeline 110, a processing stage 120 would have to be introduced for each instruction necessary for the performance of the operation. Furthermore, each processing stage 120 would advantageously have to support the operation, thus requiring more hardware in each processing stage 120. Hence, it is often cheaper to use a device, external to the pipeline 110, for performing time consuming tasks.

A point in pipeline 110 which has access to one or more devices will hereinafter be referred to as an access point. Part or all of the additional information 135 and/or part or all of the data block 130 can be processed in a device. Normally, the entire data block 130 and the entire additional information 135 will not flow through the device. Therefore, when access to a device is introduced to a pipeline 110, care has to be taken so that the result of the operation performed in the device is associated with the correct data block 130 when the result is returned to the pipeline 110. If no special action is taken, there is an obvious risk of mixing up the order of the results in relation to the order of the data blocks 130.

According to the invention, the risk of mixing up the order of the results that are to be returned to the data blocks 130 in pipeline 110 from one or several devices is eliminated by introducing, in the access point, First In First Out (FIFO) stores at least for the storage of data that enters the access point, e.g. data block 130 and associated additional information 135, and for the storage of responses received from the device. Furthermore, a synchronisation mechanism is introduced in the access point, said synchronisation mechanism for the synchronisation of fetching the first entries in said FIFO stores, so that the first entry fetched in the FIFO store(s) for storing data that enters the access point is associated with the correct response fetched from the FIFO store for storing responses from the device.

According to one embodiment of the invention, the synchronisation mechanism is implemented as a fixed time delay mechanism. A fixed time delay can then be introduced for each data packet 125 that enters the access point. The fixed time delay can preferably be adapted to be equal to, or longer, than the time it takes for the processing of the most time-consuming operation that is available in any of the devices that can be accessed from the access point. When the fixed time delay has elapsed, the first entries of the FIFO stores can be fetched for further processing. An advantage obtained by this embodiment of the synchronisation mechanisms is that the time used for the processing of a data packet 125 in an access point is the same for each data packet 125, so that the distribution of data packets 125 may be maintained and jitter may be avoided.

According to another embodiment of the invention, the synchronisation mechanism could be implemented as completion driven conditional logic. When the condition of all relevant FIFO stores having data in the first entry is fulfilled, the first entry in each of the relevant FIFO stores is fetched for further processing. Since every packet 125 is not necessarily processed by any or all devices available, information regarding which FIFO stores are relevant for a certain data packet 125 could in this embodiment preferably be included in additional information 135 and used by the completion driven conditional logic. This embodiment can advantageously be used in implementations where the time used for processing of different data packets 125 does not show significant variations, or where jitter does not cause significant problems.

Figure 2:
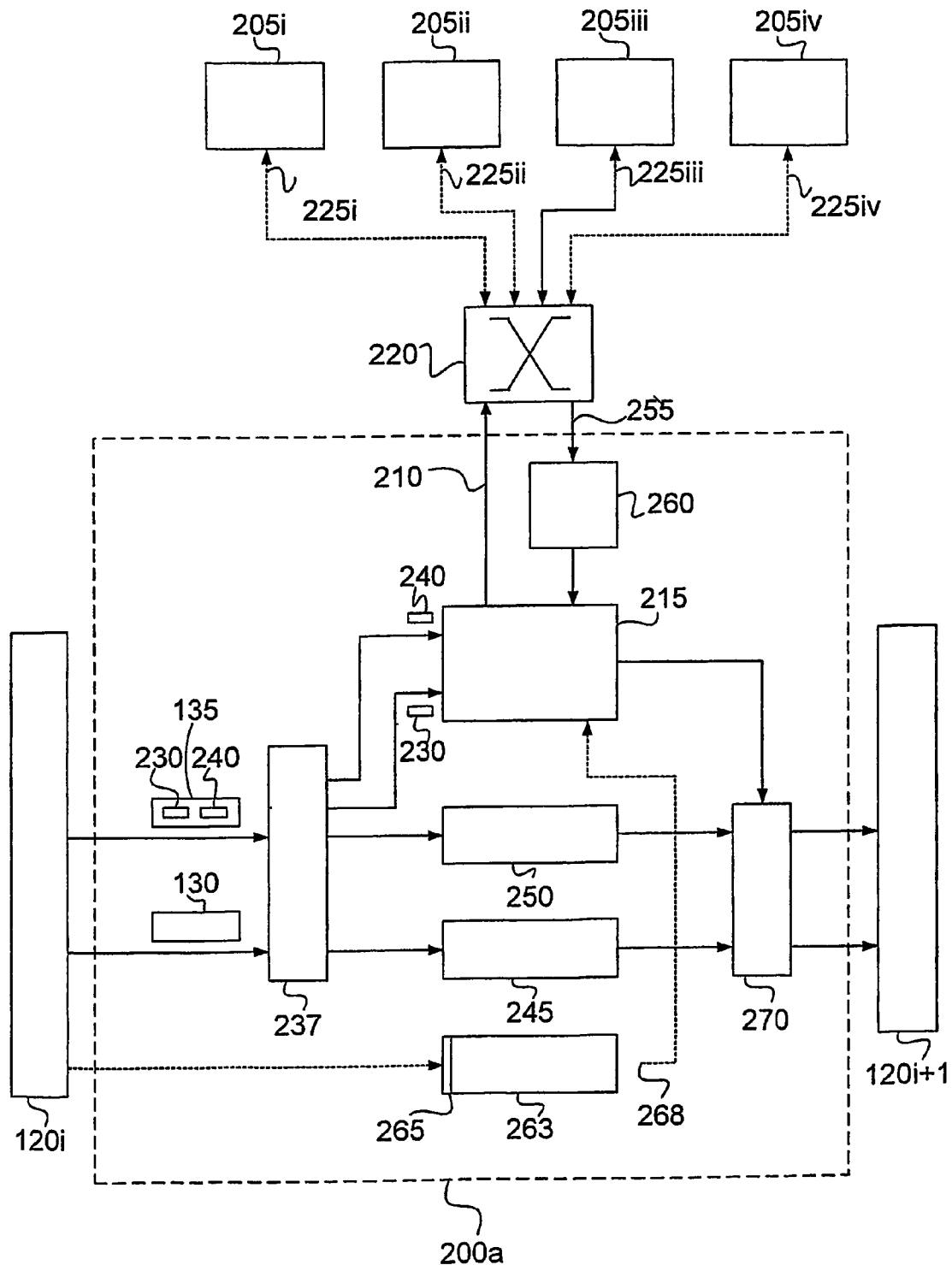
FIG. 2 is a schematic drawing of an access point, providing access to a device from a pipeline in a processor operating according to a pipelined processing technique.

In FIG. 2, one embodiment of the invention is illustrated. In order to simplify the description, only one device 205 at a time can be accessed from access point 200a of FIG. 2 via a transmit connection 210. However, as will be seen later in relation to FIG. 7, other embodiments of the invention can provide simultaneous access to several devices 205 from an access point 200 by use of several transmit connections 210.

In FIG. 2, an access point 200a is illustrated between processing stage 120i and processing stage 120i+1, the access point 200a having access to one device 205 at a time. In FIG. 2, four different devices 205i-iv are shown in order to illustrate the possibility of configuring access point 200a to provide access, via transmit connection 210, to either one of devices 205i-iv, the configuration preferably taking place during the boot procedure of processor 100. Each of devices 205i-iv are connected to a switch 220 via connections 225i-iv. When access point 200a is configured, one of connections 225i-iv is connected to transmit connection 210 via switch 220. In FIG. 2, the connection 225iii is illustrated to be the connection which is connected to transmit connection 210, and hence, device 205*iii* is the device 205 which can at present be accessed via access point 200*a*. The transmit connection 210 is preferably further connected to an access unit 215 of access point 200*a*. The access unit 215 preferably comprises a request port for transmitting requests to device 205 and a receive port for receiving responses from device 205. Access unit 215 is furthermore preferably adapted to preparing requests to be sent to device 205 and to handling responses received from device 205. The functionalities of access unit 215 may be physically co-located, but may just as well be distributed amongst different locations in access point 200.

Upon entry in access point 200*a*, data block 130 and associated additional information 135 could suitably enter a request extraction entity 237, in which information relevant to the access of device 205*iii* is extracted from data block 130 and/or additional information 135, and then forwarded to access unit 215. In one embodiment of the invention, such information relevant to the access of a device 205 is stored in the general purpose register 160 of additional register 155 in a processing stage 120. Hence, the contents of general purpose register 120*i*, hereinafter referred to as general purpose register contents 230, is extracted in request extraction entity 237 and sent to access unit 215. Furthermore, an access point reference 240 may be extracted by request extraction entity 237 and forwarded to access unit 215. Access point reference 240 could advantageously be stored as part of the special purpose register 165 in processing stage 120*i*, and could preferably comprise data processing information relating to which operations should be performed by device 205*iii*, and which data should be used in the operation performed by device 205*iii*. Data block 130 and additional information 135 enter data block FIFO store 245 and additional information FIFO store 250, respectively. Access unit 215 could advantageously comprise a FIFO store for storing data processing information relating to which actions should be taken when a response is received from the device 205*iii*, if any, said FIFO store hereinafter referred to as the access unit FIFO store.

In an alternative embodiment, general purpose register contents 230 and access point reference 240 could be extracted from additional information 135 by processing stage 120*i*, prior to data block 130 entering access point 130, instead of being extracted by request extraction entity 237. Request extraction entity 237 could then be omitted.

Access point reference 240 can preferably have been generated by any of the processing stages 120 which have operated upon data block 130 and/or additional information 135 prior to data block 130 and additional information 135 enter access point 200*a*. An example of information that access point reference 240 can comprise is given in FIG. 3, wherein access point reference 240 is shown to comprise data processing information 300, comprising data fields 302, 305, 310, 315, 320 and 325. Data field 302, hereinafter referred to as operation code 302, represents the operation that should be requested of device 205*iii*. The nature of the operations that can be performed by a certain device 205 obviously depends on the nature of the device 205. For example, if a device 205 is a Content Addressable Memory (CAM), then examples of requestable operations could be CAM write, CAM look-up or CAM read etc. For other types of devices 205, examples of requestable operations could be division, multiplication, counting of packets, or any other operation. Preferably, predetermined codes can be used for the representation of requested operations, so that operation code 302 comprises the code that has been agreed to represent the requested operation. Preferably, one of the codes could represent a no-operation-request, i.e. that no operation is requested. Data processing information 300 of FIG. 3 further comprises a data field 305, hereinafter referred to as address location 305, representing a location in additional information 135 where an address to a memory location in device 205 is stored, a data field 310, hereinafter referred to as request data location 310, representing a location in additional information 135 where the request data is stored, and a data field 315, hereinafter referred to as response data location 315, representing a location in additional information 135 where the response data should be stored. Data processing information 300 may further comprise a data field 320 representing the request data size, referred to as request data size 320, as well as a data field 325 representing the response data size, referred to as response data size 325. Memory location 305 can preferably be omitted, should the device 205 not require such addressing. Memory location 305, request data location 310 and response data location 315 can advantageously point at locations in the general purpose register content 230. Obviously, data processing information 300 preferably comprises the data fields necessary for handling requests to a device 205, and the data processing information illustrated in FIG. 3 is only an example.

Referring now to FIG. 2, access unit 215 determines, based on the data processing information 300 included in access point reference 240, what data should be included in a request transmitted to device 205*iii* via transmit connection 210, and then transmits this information to device 205*iii*. Device 205*iii* processes the data, and returns a response to access point 200*a* via receive connection 255. Receive connection 255 is preferably connected between the device 205*iii* and a response FIFO store 260 in the access point 200*a*. Response FIFO store 260 can then be further connected to access unit 215.

In order to synchronise the fetching of data from the FIFO stores, a synchronisation mechanism can advantageously be introduced to access point 200. In FIG. 2, the synchronisation mechanism is shown to be a fixed time delay mechanism, the fixed time delay mechanism being capable of transmitting a triggering signal when a fixed period of time has elapsed since the fixed time delay mechanism was initiated. The fixed time delay mechanism could preferably be initiated when a data block 130 and associated additional information 135 enter access point 200*a*. The fixed time delay could advantageously be adjusted to the number of clock ticks needed in order to complete the most demanding operation that could be performed by any of the devices 205*i-iv*, so that, when the fixed time of the fixed time delay mechanism has elapsed, the device 205 attaining to the request would have had time to process the request and deliver a response to response FIFO store 260, regardless of which operation in devices 205*i-iv* was requested. The fixed time delay mechanism could advantageously comprise a shift register. Alternatively, the fixed time delay mechanism could comprise a counter, or a table comprising the data packets 125 that has entered access point 200*a*, or any other device that could produce a fixed time delay. In FIG. 2, the fixed time delay mechanism is shown to be a shift register 263. A triggering value 265, comprising one or several bits, is shown to have been shifted into the shift register 263 in FIG. 2 in order to initiate the fixed time delay mechanism. The size of shift register 263 should advantageously be adjusted according to the number of clock ticks needed in order to complete the most demanding operation that could be performed by any of devices 205*i-iv*, so that, e.g., the number of positions in shift register 263 equals the number of clock ticks needed to by access point 200*a* to handle the most demanding operation. Upon each clock tick, triggering value 265 moves one position in shift register 263.

When the triggering value 265 has reached the end of shift register 263, the triggering value 265 could preferably be sent to access unit 215 as a triggering signal 268, the triggering signal 268 indicating that the response relating to the first entries in data block FIFO store 245 and additional information FIFO store 250 have arrived in response FIFO store 260. Provided that all requests received by device 205iii are processed in the sequence that they arrive, the first response in response FIFO store 260 will correspond to the first data block 130 in data block FIFO store 245. Upon reception of the triggering signal 268, access unit 215 can preferably fetch the first response in response FIFO store 260, and forward said first response to the response substitution entity 270. The response substitution entity 270 can preferably, upon receiving said first response, fetch the first entries in data block FIFO store 245 and additional information FIFO store 250, said first entries being the data block 130 and the additional information 135 to which said first response corresponds. In the response substitution entity 270, said first response can substitute relevant parts of data block 130 and additional information 135. This substitution should preferably be performed according to the data processing information 300 relating to response handling, which could be fetched from access unit 215 by response substitution entity 270.

In an alternative embodiment, the triggering signal 268 is transmitted to response substitution entity 270 as well as to access unit 215. The response substitution entity 270 would then perform the fetching of the first entries of data block FIFO store 245 and additional information FIFO store 250 upon reception of triggering signal 268. In another embodiment, the triggering signal 268 is transmitted only to response substitution unit 270, which could fetch the response, the data block 130 and the additional information 135 upon reception of the triggering signal 268. In yet another embodiment, the fetching of the first entries in data block FIFO store 245 and additional information FIFO store 250 is performed by access unit 215 upon reception of the triggering signal 268. Access unit 215 would then forward said first entries together with the first entry in response FIFO store 260 to response substitution entity 270. This embodiment is particularly suitable if only one device 205 can be accessed at a time by an access point 200. Response substitution entity 270 could comprise access unit 215, or access unit 215 could be implemented as a separate entity. In implementations where several devices 205 may be accessed simultaneously from an access point 200, response substitution entity 270 could comprise an access units 215 per transmit connection 210.

The triggering value 265 could be shifted into shift register 263 by request extraction entity 237 when the data block 130 and additional information 125 enter data block FIFO store 245 and additional information FIFO store 250, or by the access unit 215 when a request is sent to device 205, or by the processing stage 120i preceding access point 200, as shown in FIG. 2.

Figure 4A:
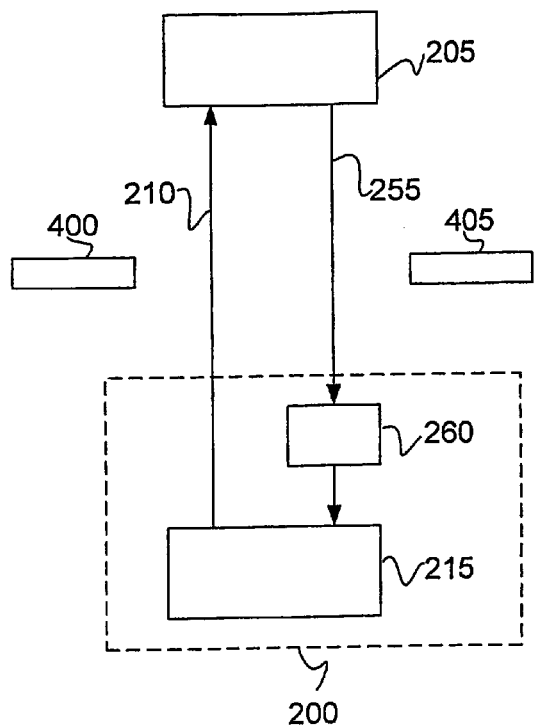
FIG. 4a is an illustration of the transmission of a request to a device from an access point and the reception of a response from the device.

The transmission of data to/from device 205iii from/to access point 200a is further illustrated in FIG. 4a. Transmit connection 210 and receive connection 255 make up a request channel. On transmit connection 210, access unit 215 transmits a request 400 to device 205, where the request is processed. When device 205 has finished the processing of request 400, device 205 transmits a response 405 to access point 200a via receive connection 255. Response 405 is received by response FIFO store 260, from which response 405 can be fetched by access unit 215 or response substitution entity 270.

A request channel, comprising a transmit connection 210 and a receive connection 255, is a logical channel which is preferably dedicated to the transmission of requests from an access point 200 to one device 205. If e.g. TDMA (Time Division Multiple Access) is used, a request channel could advantageously utilise one or more pre-defined time slots. In another embodiment, each request channel could correspond to a physical channel in a point-to-point configuration.

Figure 4B:
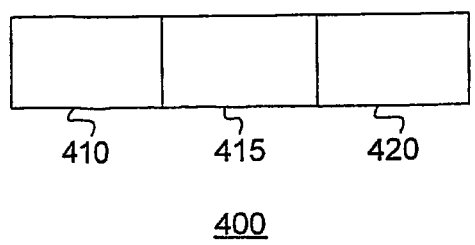
FIG. 4b is an example of a request to a device.

An example of a request 400 is illustrated in FIG. 4b. Request 400 of FIG. 4b comprises an operation field 410 for the representation of the operation that is requested of the device 205. Predetermined codes could be used for the representation of requested operations, so that data field 410 comprises the code that has been agreed to represent the requested operations. Advantageously, the coding scheme used for the representation of operations in data field 302 of data processing information 300 could be used. Furthermore, request 400 of FIG. 4b comprises a request data field 415, containing the data that should be used in the requested process. Request 400 of FIG. 4b further comprises an address field 420, in which an address to a memory in device 205 can be transmitted. Should device 205 not require such addressing, address field 420 can preferably be omitted.

Figure 4C:
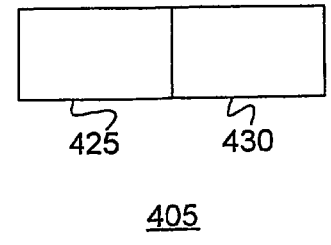
FIG. 4c is an example of a response from a device.

In FIG. 4c, an example of a response 405 is illustrated. Response 405 preferably comprises a request complete field 425, which can advantageously be implemented as a flag which takes one value if the request has been completed, and another value should the request have failed. Response 405 further comprises a response data field 430, in which response data can be transmitted. Obviously, request 400 and/or response 405 could comprise other data fields when necessary.

In one embodiment of the invention, additional information 135 comprises information relating to which instructions in the subsequent processing stage 120 should be executed. This information will hereinafter be referred to as the program counter. Preferably, the program counter could be stored, in a processing stage 120, in the special purpose register 165 of additional register 155, i.e. the program counter could preferably be part of the special purpose register contents. Advantageously, the program counter could be altered based on the operations performed by a device 205. In an embodiment where the program counter is not part of the general purpose register contents 230, this could be achieved by including a field in data processing information 300, referred to as the program counter location. The program counter location could indicate where a program counter value, included in response 405, is to be stored. The program counter location could e.g. point at a location in the general purpose register contents 230. By exchanging the program counter value in the special purpose register contents of additional information 135 with the value stored in the location indicated by the program counter location after the response data field 430 of response 405 has been merged with the general purpose register contents 230, the program counter can take a value resulting from the operations performed by device 205. This exchange can preferably be performed by the response substitution entity 270. Alternatively, the program counter value included in response 405 could be stored as the new program counter in the special purpose register contents of additional information 135 straight away when the response 405 is merged with additional information 135 and data block 130. Obviously, other parameters not included in the general purpose register contents 230 could be treated in a similar way.

The value of data processing information 300 can in a typical implementation of the invention vary between a rather limited number of combinations of values of data fields. The number of allowed combinations of data fields in data processing information 300 could typically take a value of 10 or 20. Rather than including the entire data processing information 300 in access point reference 240, one could advantageously instead include a representation of the combination of data fields forming the data processing information 300, such representation being referred to as a driver identifier. The driver identifier could preferably be generated by one or several processing stages 120, and included in the additional information 135. In FIG. 5a, a driver table 500 is shown comprising six different driver identifier entries, each comprising a possible value of driver identifier 505, and corresponding data processing information entries comprising data processing information 300 which the driver identifier values represent. Each value of driver identifier 505 in the driver table 500 could preferably refer to a different value of data processing information 300. Obviously, a driver identifier 505 could represent a value of data processing information 300 formed of a combination of any number of data fields, and does not have to be limited to the four data fields shown in FIG. 5a. A driver table 500 can advantageously be stored at access point 200, as will be described further in relation to FIG. 7. FIG. 5b, an example of an access point reference 240 for an embodiment using driver identifiers 505 is illustrated. Access point reference 240 of FIG. 5b comprises a driver identifier 505 and no data processing information 300.

When using a driver table 500 in access point 200 and including a driver identifier 505 in access point reference 240, rather than the entire data processing information 300, the processing resources in the processing stages 120 that are used for obtaining access point reference 240 can be reduced. Furthermore, an abstraction layer is introduced to the access point 200, so that the values of data processing information 300 can be altered without changing the operation of the processing stages 120. The data processing information 300 corresponding to a value of driver identifier 505 in driver table 500 can be altered, preferably during configuration of the access point 200. Hence, the introduction of driver identifier tables 550 to access point 200 facilitates for the exchange of a device 205 to a different device 205, or for the change of operations for which a device 205 can be used by access point 200.

A device 205 could advantageously be accessed from different access points 200 in a pipeline 110. The processing resources provided by a device 205 can hence be efficiently utilised, since a device 205 can be used at different stages in the pipeline 110. A device 205 that can be accessed from more than one access point 200 could advantageously comprise a request FIFO for each access point 200 from which the device 205 can be accessed, in order to avoid that requests 400 from different access points are mixed up. A further advantage of such a request FIFO is that the device 205 can operate at clock frequency different to the clock frequency of the pipeline 110, so that, e.g., a device 205 may comprise a pipeline operating at a different clock frequency than pipeline 110. Furthermore, different operations that can be requested by the same access point 200 from a device 205 can use different number of clock cycles. Hence, a request FIFO could advantageously be implemented also in a device 205 which can be accessed by only one access point 200.

FIGS. 6a-e illustrate the flow of a data packet 125, comprising two data blocks 130, through an access point 200 comprising a shift register 263, a data block FIFO store 245, an additional information FIFO store 250 and a response FIFO store 260. FIG. 6a shows the first clock tick, upon which the first of the two data blocks 130 of data packet 125 enters the data block FIFO store 245. At the same time, additional information 135 associated with data block 125 enters the additional information FIFO store 250, and a triggering value 265 is initiated in shift register 263. In order to simplify the description, shift register 263 is shown to have only four positions, although in most implementations, shift register 263 would be longer. A request 400, not shown in the figure, is transmitted to device 205. Upon the next clock tick, as is illustrated in FIG. 6b, the second data block 130 of data packet 125 enters the a data block FIFO store 245, and the triggering value 265 is moved forwards in shift register 263. Meanwhile, the request 400 is processed by device 205. Upon the following clock tick, as is shown in FIG. 6c, a response 405 is transmitted from device 205 to the response FIFO store 260. Triggering value 265 is moved forwards in shift register 263, and another data packet, comprising only one data block, enters the access point. Another triggering value is shifted into shift register 263 in relation to this another data packet. Upon the next clock tick, as is illustrated in FIG. 6d, the triggering value 265 reaches the last position in shift register 263. Upon the following clock tick, a triggering signal 268 is sent from shift register 263, to access unit 215 and/or response substitution unit 270, not shown in the figure. As is illustrated in FIG. 6e, the first data block 130 in data block FIFO store 245, the additional information 135 in additional information FIFO store 250 and the response 405 in the response FIFO store 260 are fetched, either by access unit 215 or substitution entity 270, depending on the implementation of the invention. The data packet 125, the additional information 135 and the response 405 can then be processed according to the implementation, preferably in a response substitution entity 270. As can be seen in FIG. 6e, another response, corresponding to the another data packet, has been sent from device 205 to response FIFO store 260.

Figure 7:
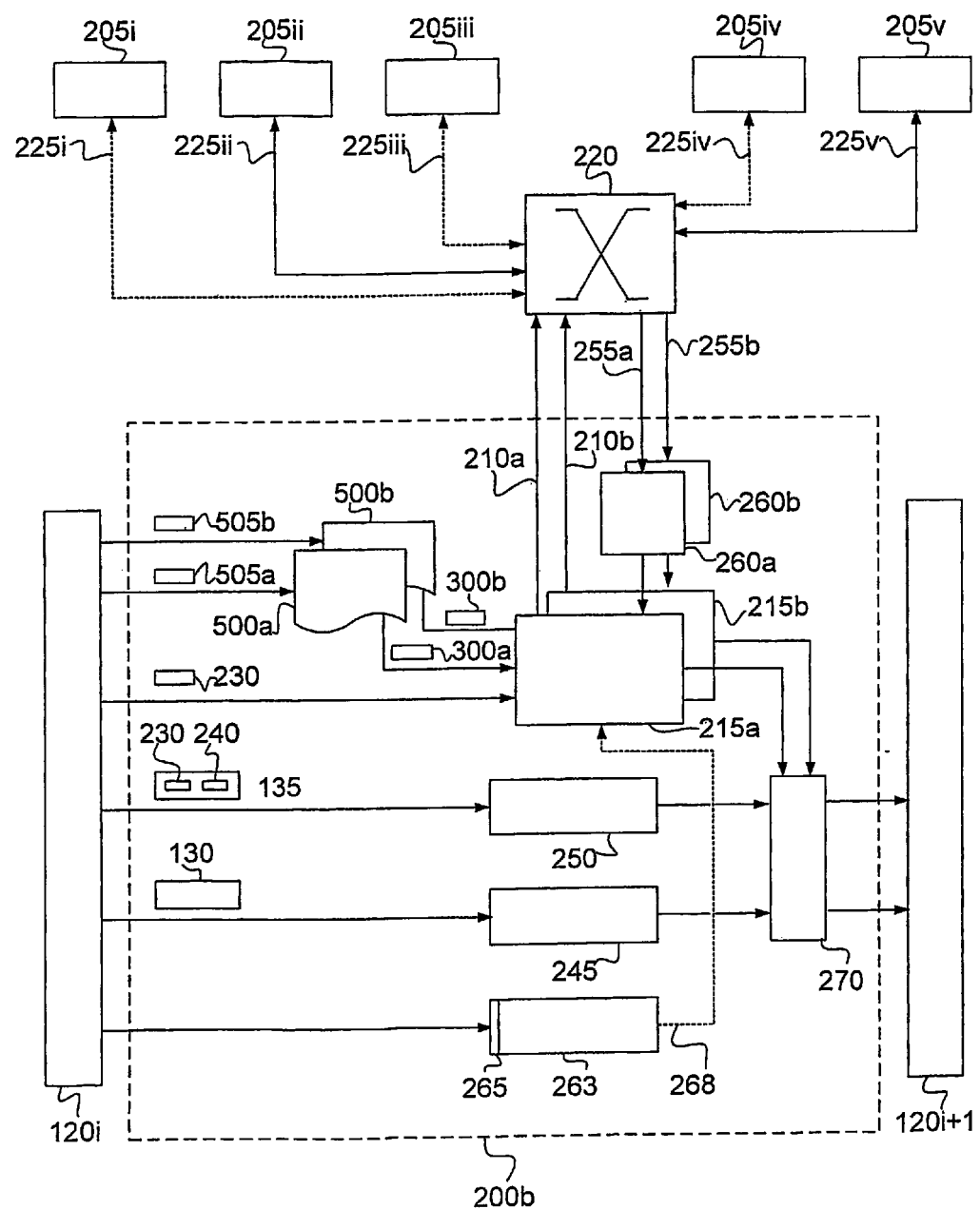
FIG. 7 illustrates an example of an access point providing access to more than one device.

In FIG. 7, an access point 200b is shown, providing access to two different devices 205 via two separate request channels made up of transmit connections 210a and 210b and receive connections 255a and 255b. Access via transmit connection 210a is handled by an access unit 215a, while transmit connection 210b is handled by an access unit 215b. Transmit connection 210a is connected between access unit 215a and a switch 220, while transmit connection 210b is connected between access unit 215b and switch 220. Transmit connection 210a of FIG. 7 can be configured to be connected via switch 220 to either one of devices 205i, 205ii, or 205iii, while transmit connection 210b can be configured to be connected via switch 220 to either one of devices 205iv and 205v. In FIG. 7, switch 220 is shown to be configured so that transmit connection 210a is connected to device 205ii, while transmit connection 210b is connected to device 205v. Hence, device 205ii and 205v can be accessed from access point 200b via transmit connection 210a and 210b, respectively. In alternative embodiments, a transmit connection 210 can be configured to be connected to any of the devices 205 connected to switch 200. Any device 205 that can be accessed by any access point 200 of processor 100 could suitably, but not necessarily, be connected to the same switch 200.

Access point 200b of FIG. 7 comprises two driver identifier tables 500a and 500b, relating to the access of devices 205 connected to access point 200b via transmit connection 210a and 210b, respectively. When a data block 130 enters access point 200b, it is preferably accompanied by additional information 135 comprising general purpose register content 230 and access point reference 240, the latter comprising driver identifiers 505a and 505b. In analogy to FIG. 2, general purpose register content 230 could preferably enter access units 215a and 215b. Driver identifier 505a enters driver table 500a, in which the value of data processing information 300 corresponding to the value of driver identifier 505a is identified. The data processing information 300a is then forwarded to access unit 215a, which uses data processing information 300a for determining which information should be included in request 400a to be sent on transmit connection 210a (cf. FIG. 4). In a similar manner, driver identifier 505b enters driver table 500b, in which the value of data processing information 300 corresponding to the value of driver identifier 505b is identified. The data processing information 300b is then forwarded to access unit 215b, which prepares request 400b, to be sent on transmit connection 210b, according to data processing information 300b.

In the embodiment of the invention shown in FIG. 7, general purpose register contents 230 and the access point reference 240 comprising the driver identifiers 505 are extracted by the processing stage 120i preceding access point 200b. However, access point 200b could alternatively have a request extraction entity 237 in which the general purpose register contents 230, and access point reference 240 could be extracted, cf. FIG. 2.

When device 205ii has performed the operation requested of device 205ii, a response 405a is transmitted on receive connection 255a to response FIFO store 260a. Similarly, when device 205v has performed the operation requested of device 205v, a response 405b is transmitted on receive connection 255b to response FIFO store 260b. Responses 405a and 405b can then be forwarded to access unit 215a and access unit 215b, respectively, on demand. In order to guarantee that responses 405a and 405b will be associated to the correct data block 130 in access units 215a and 215b, a fixed time delay mechanism could be included in the access point 200b, the fixed time delay provided by the fixed time delay mechanism being adjusted to the number of clock ticks needed in order to complete the most demanding operation that could be performed by any of devices 205i-v. In FIG. 7, the fixed time delay mechanism is shown to be a shift register 263. When a data block 130 enters access point 200b, a triggering value 265 could be shifted into shift register 263. When triggering value 265 reaches the end of shift register 263, the operations required by the two devices 205 connected to transmit connections 210a and 210b will have been completed and the responses 405a and 405b will have been stored in response FIFO store 260a and 260b, respectively. When triggering value 265 reaches the end of shift register 263, the triggering value 265 could suitably be sent as a triggering signal 268 to access units 215a and b, the triggering signal 268 indicating that the responses 405a and 405b relating to the first entries in data block FIFO store 245 and additional information FIFO store 250 are now stored in response FIFO stores 260a and 260b, respectively. Upon reception of the triggering signal 265, access units 215a and 215b can preferably fetch the first responses 405a and 405b in response FIFO stores 260a and 260b, and then forward said responses to the response substitution entity 270. Preferably, access units 215 also forward the part of data processing information relating to response handling, stored in the access unit FIFO, to the response substitution entity 270. Triggering signal 268 could be sent from shift register 263 also to response substitution entity 270, which upon reception of the triggering signal 268 could fetch the first entries in data block FIFO store 245 and additional information FIFO store 250, respectively. Alternatively, response substitution entity 270 could fetch said first entries, corresponding to data block 130 and additional information 135, responsive to the reception of the first response 405a and 405b transmitted by access units 215a and 215b, or the triggering signal 268 could be transmitted to response substitution entity 270, the response substitution entity 270 fetching the first response of the relevant FIFO stores responsive to the reception of the triggering signal 268. In the response substitution entity 270, the responses 405a and 405b which have been fetched from the response FIFO stores 260a and 260b can substitute relevant parts of data block 130 and additional information 135. This substitution should preferably be performed according to the information in the relevant part of the data processing information 300a and 300b, which preferably could be transmitted from access units 215a and 215b to response substitution entity 270. Should any part of the response 405a for some reason be indicated to be stored at the same location as a part of response 405b, precedence rules could be set up during configuring of the access point 200b.

Figure 8:
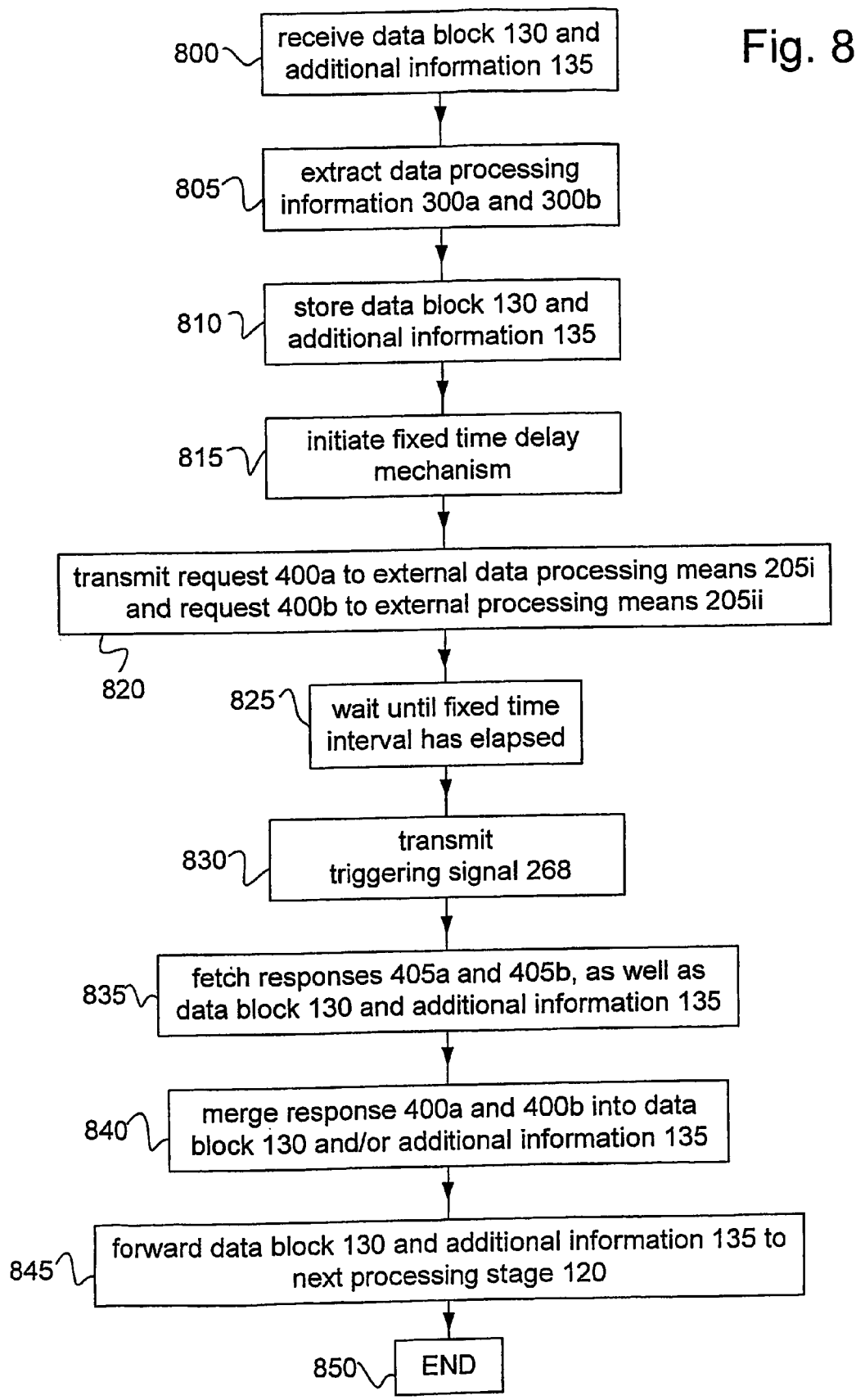
FIG. 8 is a flowchart illustrating an example of a method of handling the access to a device.

In FIG. 8, a method of simultaneously accessing two devices 205i and 205ii from an access point 200 according to the invention is illustrated. In step 800, a data block 130 and associated additional information 135 is received by access point 200. Data processing information 300a and 300b, relevant to the access of devices 205i and 205ii, respectively, are then extracted. In an embodiment comprising driver identifier tables 500, this extraction is preferably performed by using driver identifiers 505a and 505b in additional information 135 to find the relevant data processing information 300a and 300b in driver identifier tables 500a and 500b. The extraction of driver identifier 505a and 505b from additional information 135 could advantageously be performed in a request extraction entity 237. Alternatively, in an embodiment which does not comprise data processing information tables 500, the data processing information 300a and 300b could be extracted in the request extraction entity 237. In an implementation of access point 200 which does not comprise a request extraction entity 237, the extraction of access point reference 240 could e.g. be performed by the processing stage 120 preceding access point 200.

In step 810 of FIG. 8, the data block 130 and the additional information 135 are stored in a data block FIFO store 245 and an additional information FIFO store 250, respectively. Step 815 is then entered, in which a fixed time delay mechanism is initiated. The fixed time delay mechanism could alternatively be initiated before step 805 or 810, or after step 820. The time delay provided by the fixed time delay mechanism could then, if necessary, be adjusted accordingly.

In step 820, a request 400a, based on the information in data processing information 300a, is transmitted to device 205i, and a request 400b, based on the information in data processing information 300b, is transmitted to device 205ii. The request 400a and 400b are advantageously prepared and transmitted by access units 215a and 215b, respectively. In step 825, the elapse of the fixed time delay initiated by the fixed time delay mechanism is awaited. When the fixed time delay initiated by the fixed time delay mechanism has elapsed, step 830 is entered, in which a triggering signal 268 is transmitted, indicating that responses 405a and 405b associated with data block 130 are stored as the first entries in response FIFO stores 260a and 260b, respectively. The transmit signal 268 can advantageously be transmitted to the access units 215, and/or the response substitution entity 270. In step 835, the responses 405a and 405b, as well as the data block 130 and the additional information 135, are fetched in respective FIFO stores by access units 215a and 215b, or by response substitution entity 270. The relevant parts of responses 400a and 400b are then merged into the relevant positions in data block 130 and/or additional information 135 in step 840, the merging preferably taking place in response substitution entity 270. In step 845, the data block 130 and additional information 135 resulting from step 840 are forwarded to the proceeding processing stage 120. The process then ends at step 850.

Figure 9:
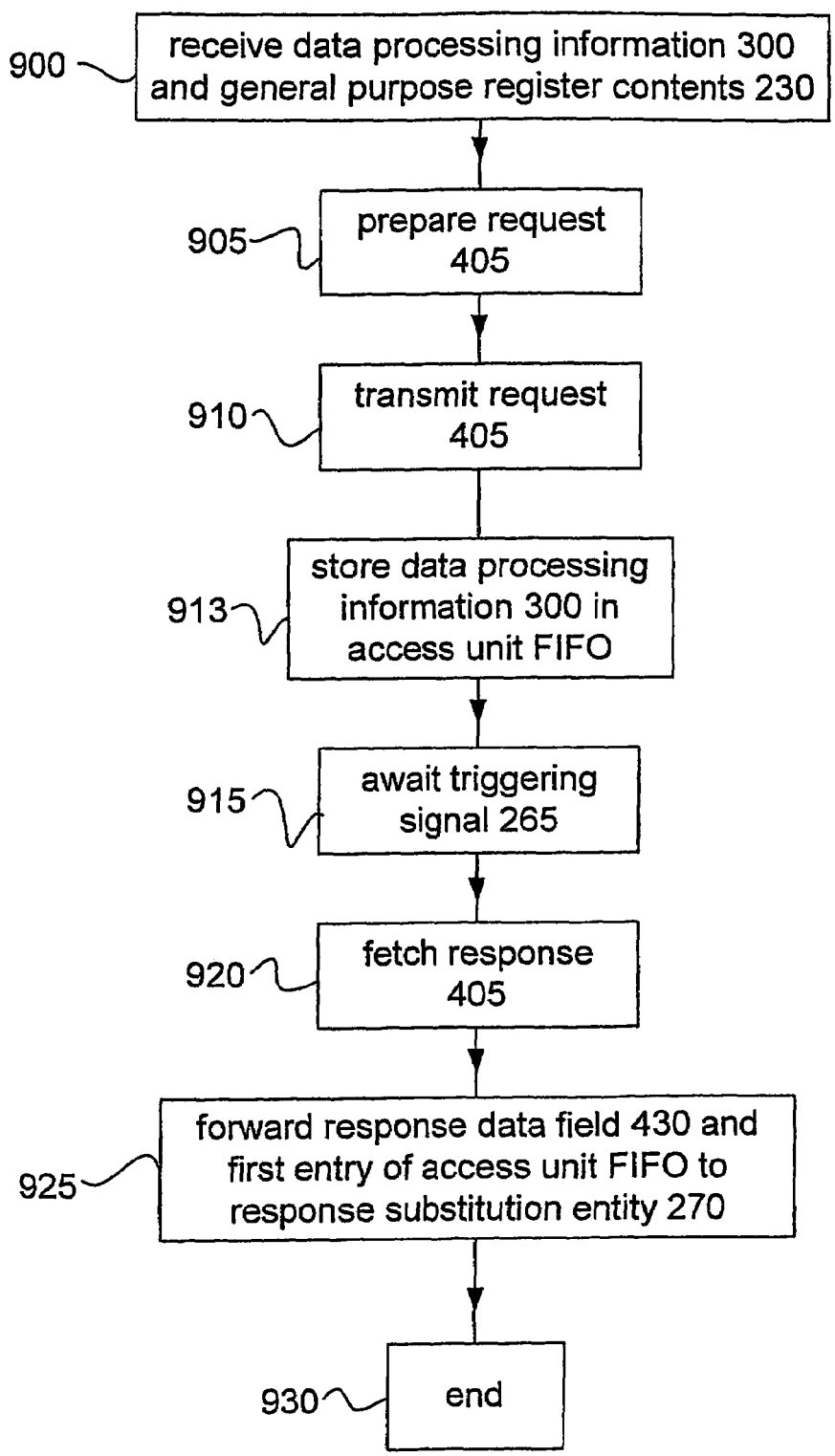
FIG. 9 is a flowchart illustrating a procedure performed by an embodiment of an access unit.

FIG. 9 is a flowchart illustrating a procedure performed, according to one embodiment of the invention, by an access unit 215 when a data block 130 has been received by access point 200. In step 900, data processing information 300 and general purpose register contents 230 associated with a data block 130 is received by access unit 215. In step 905, access unit 215 prepares a request 405 according to data processing information 306 received in step 900. The request 405 is then transmitted, in step 910, to device 205 on transmit connection 210. Step 913 is then entered, in which the part of data processing information 300 relevant to the handling of the response 405 which will be received from device 205 is stored in the access unit FIFO store. In step 915, access unit 215 awaits a triggering signal 268. When the triggering signal 268 has been received, step 920 is entered, in which response 405 is fetched in response FIFO store 260. Step 925 is then entered, in which the relevant parts of the response 405, such as e.g. the response data field 430, is forwarded to response substitution entity 270, to be merged into additional information 135 and/or data block 130 according to the data processing information 300 received in step 900. Preferably, the first entry in access unit FIFO store could also be forwarded to response substitution unit 270 in step 930. In step 930, the procedure is ended.

The procedure of FIG. 9 could be modified in several ways. In one embodiment of the invention, the access unit 215 may be adapted to fetching the first entries in data block FIFO store 245 and in additional information FIFO store 250 upon reception of the triggering signal. The merging of the response 400 into data block 130 and/or additional information 135 could then be performed by access unit 215, or by substitution entity 270. Furthermore, in an embodiment where access point 200 provides access to several devices 205, access unit 215 may check which response should take precedence if the data processing information 300 specifies that more than one response 405 should be stored at the same location in additional information 135 or data block 130, and then act accordingly. Alternatively, this check could be performed by response substitution entity 270. The access unit 215 could furthermore preferably perform a check as to whether the requested operation has been successfully performed by device 205. If request complete field 425 of response 405 shows that the request has not been completed, the access unit 215 could e.g. decide that data block 130 should be discarded.

Access points 200a and 200b, shown in FIG. 2 and FIG. 7 respectively, could be varied in many ways. Obviously, an access point 200 could have any number of request channels providing simultaneous access to any number of devices 205. The synchronisation mechanism could be implemented as completion driven conditional logic, rather than as the fixed time delay mechanism illustrated by FIGS. 2 and 7. In access point 200b, access unit 215a and 215b could be implemented as an integrated access unit 215. Request extraction entity 237 and/or response substitution entity 270 could then be implemented as part of access unit 215. Furthermore, driver tables 505a and 505b could be implemented as an integrated driver table 505, as long as the values available to driver identifier 505a are different to the values available to driver identifier 505b. In one embodiment of the invention, access unit 215 can be implemented as a request port and a separate response port. Moreover, data block FIFO store 145 and additional information FIFO store 150 could be implemented in the same FIFO store.

An access point 200 can preferably be located anywhere in pipeline 110, as well as between input 105 and pipeline 110, or between pipeline 110 and output 115. If an access point 200 is located before the pipeline 110, the access point reference 240 can obviously not be generated by a processing stage 120 of pipeline 110, but could e.g. be generated by input 105, or be extracted from additional information 135 by a request extraction entity 237. A device 205, external to the pipeline 110, could be implemented as a device internal to processor 100, located on the same chip as processor 100, or could be implemented as an external device, located on a different chip.

The processor 100 could be implemented as an integrated circuit (i.e. as an ASIC), as part of an integrated circuit, or as many integrated circuits connected to each other.

The inventive processor 100 could advantageously be implemented in any node in a data communication system, in which data packets are processed. Examples of such nodes are routers and telecommunication switches for packet data. A processor 100 could then be part of a computer unit, such as a network computer unit or a signal processing computer unit.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A processing means for pipelined processing of data packets, said processing means comprising:
   an input arranged to receive data packets;
   an output;
   a device; and
   a pipeline connected between the input and the output,
   said pipeline having i) on an input side, at least one processing stage connected to receive the data packets from the input, ii) an access point connected to an output of said one processing stage, iii) a request channel connecting said access point to said device, said request channel comprising a transmit connection for transmitting a request from said access point to said device and a receive connection for said access point to receive a response from said device, said request being based on data processing information extracted from at least part of one of said data packets and any additional information associated with said one data packet, said request being at least one of i) a first type of said request directing said device to perform a data processing operation which alters said one data packet, and ii) a second type of said request directing said device to perform a data processing operation which alters said any additional information associated with said one data packet, said response to said first type of said request including an alteration to said one data packet, said response to said second type of request including an alteration to said any further additional information associated with said one data packet, wherein,
   said access point comprises
   i) at least one FIFO store for storing data entering the access point, said data corresponding to said at least part of said one data packet and said any additional information associated with said one data packet,
   ii) a response FIFO store connected to said device via said receive connection, said response FIFO store for storing a first response corresponding to said request, said first response received on the receive connection, iii) a synchronization mechanism arranged to synchronize fetching of a first entry in said at least one FIFO store and the first response in said response FIFO store, said first entry corresponding to said at least part of said one data packet and said any additional information associated with said one data packet, and iv) a response substitution entity connected to receive a) said first response as an output of said response FIFO store and b) said first entry as an output of said at least one FIFO store, said response substitution entity arranged to form a resultant data packet by merging said received first response into said received first entry, said resultant data packet being an output of said access point.

2. The processing means of claim 1, wherein, said input is a receiver, said output is a transmitter, said access point comprises plural of said request channel, and said access point provides simultaneous access to plural of said device via said plural request channels, in response to the request from said access point, each said device adapted to perform a corresponding data processing operation which alters at least a part of one of i) a corresponding data packet and ii) a corresponding additional information associated with the corresponding data packet, and a further access point is connected intermediate an output side of the input and the input side of the one processing stage such that the one processing stage is connected to receive data packets input via the further access point.

3. The processing means of claim 2, wherein, said access point comprises plural of said receive connection and plural of said response FIFO store, each one of said plural receive connections is connected to one of said plural response FIFO stores, and said access point provides simultaneous access to plural of said device via said plural request channels, in response to the request from said access point, at least one of said device adapted to perform respective corresponding data processing operations which alters i) the corresponding data packet in response to said first type of said request, and ii) the corresponding additional information associated with the corresponding data packet in response to said second type of said request.

4. The processing means of claim 2, wherein said synchronization mechanism is a fixed delay mechanism adapted to initiate a fixed time delay upon entry of at least part of a data packet into the access point.

5. The processing means of claim 4, wherein said fixed time delay is equal to or longer than the time required to process the most time consuming data processing operation by any of said plural devices.

6. The processing means of claim 4, wherein said fixed time delay mechanism comprises is adapted to transmit a triggering signal when the initiated fixed time delay has elapsed.

7. The processing means of claim 6, wherein, said access point comprises an access unit connected to said transmit connection, said access unit being adapted to receive the data processing information extracted from said one data packet, to use said data processing information in creating said request and to transmit said request to said device on said transmit connection, and said fixed time delay mechanism is adapted to sending said triggering signal at least to said access unit, said access unit being adapted to fetching the response in said response FIFO store(s) responsive to said triggering signal.

8. The processing means claim 4, wherein said fixed time delay mechanism comprises a shift register.

9. The processing means of claim 2, wherein, said access point comprises plural access units and plural of said transmit connection, each an access unit connected to different one of said transmit connections, each transmit connection connected to a different one of said devices, and each said access unit is adapted to receive the data processing information extracted from said one data packet, to use said data processing information in creating said request and to transmit said request to the connected one of said devices on said connected transmit connection.

10. The processing means of claim 2, wherein, said access point comprises a driver table comprising data processing information entries and associated driver identifier entries said access point being adapted to receiving a driver identifier and to extracting via said driver identifier, data processing information from said driver table, and said access point comprises a driver table for each of said request channels.

11. The processing means of claim 1, wherein, said access point comprises plural of said response FIFO store with a first entry, and said synchronization mechanism comprises completion driven conditional logic adapted to determine whether all relevant response FIFO stores from among said plural response FIFO stores have data in the first entry.

12. The processing means of claim 1, wherein, said access point further comprises an access unit connected to said transmit connection, and said access unit is adapted to receive the data processing information extracted from said one data packet, said access unit adapted for using said data processing information in creating said request and to transmit said request to said device on said transmit connection.

13. The processing means of claim 12, wherein, said data processing information comprises information related to the handling of the response received from said device; and said access unit comprises an access unit FIFO store for storing said information related to the handling of the response.

14. The processing means of claim 1, wherein said access point comprises a driver table comprising data processing information entries and associated driver identifier entries, said access point being adapted to receiving a driver identifier and to extracting, via said driver identifier, data processing information from said driver table.

15. The processing means of claim 1, further comprising:

at least one switch being connected between at least one transmit connection and plural devices, said switch being configurable to provide access to any one of said devices via said transmit connection.

16. An integrated circuit, comprising:

a processing means for pipelined processing of data packets, said processing means comprises an input, an output and a pipeline having at least one processing stage, said pipeline connected between the input and the output, wherein said processing means further comprises:

at least one access point providing access to a device;

a request channel connecting said device to said access point, said request channel comprising a transmit connection for transmitting a request to said device and a receive connection for receiving a response from said device, said request is based on data processing information extracted from at least part of one of said data packets and any additional information associated with said one data packet, said access point comprising at least one FIFO store for storing data entering the access point, said data corresponding to said at least part of one of said data packet and any additional information associated with said data packet;

said access point further comprising a response FIFO store connected to said device via said receive connection, said response FIFO store for storing a first response corresponding to said request and received on the receive connection; and said access point further comprising a synchronization mechanism adapted to synchronize the fetching of the first entry in said at least one FIFO store and the first response in said response FIFO store, said first entry corresponding to said at least part of one of said data packet and any additional information associated with said data packet; and wherein a response substitution entity is configured to merge said first response into said at least part of one of said data packet and any additional information associated with said data packet.

17. A computer unit comprising:

an integrated circuit having a processing means for pipelined processing of data packets, wherein said processing means comprises an input, an output and a pipeline having at least one processing stage, and wherein said pipeline is connected between the input and the output, wherein, said pipeline has at least one access point providing access to a device;

said device is connected to said access point via a request channel;

said request channel comprises a transmit connection for transmitting a requests to said device and a receive connection for receiving a response from said device;

said request being based on data processing information extracted from at least a part of one of said data packet and any additional information associated with said data packet;

said access point comprises at least one FIFO store for storing data entering the access point; said data corresponding to said at least part of one of said data packet and any additional information associated with said data packet;

said access point further comprises a response FIFO store connected to said device via said receive connection, said response FIFO store for storing a first response corresponding to said request and received on the receive connection; and said access point further comprises a synchronization mechanism adapted to synchronize the fetching of the first entry in said at least one FIFO store and the first response in said response FIFO store, said first entry corresponding to said at least part of one of said data packet and any additional information associated with said data packet; and wherein a response substitution entity is configured to merge said first response into said at least part of one of said data packet and any additional information associated with said data packet.

18. A method of pipelined processing of a data packet in a processing means comprising a pipeline, said pipeline comprising at least one processing stage, wherein said method comprising the following steps:

receiving, in an access point of said pipeline, at least part of said data packet;

extracting data processing information from said at least part of one of said data packet and any additional information associated with said data packet, storing at least part of the data packet and any additional information associated with said data packet in at least one FIFO store in said access point;

transmitting, from said access point, a request, based on said extracted data processing information, to a device on a transmit connection;

receiving, in said access point, a first response corresponding to said request, from said device on a receive connection;

storing said first response in a response FIFO store in said access point, said response FIFO store being connected to said device via said receive connection;

extracting the first response in said response FIFO store and the first entry in said at least one FIFO store, said first entry corresponding to said at least part of one of said data packet and any additional information associated with said data packet; and merging, said first response into said at least part of one of the data packet and any additional information associated with said data packet.

19. The method of claim 18, wherein more than one request is transmitted simultaneously from said access point on more than one transmit connection, each transmit connection being connected to a different device.

20. The method of claim 18, comprising the further step of initiating a fixed time delay, wherein said step of extracting is performed responsive to the elapse of said fixed time delay.

21. The method of claim 20, wherein a triggering signal is generated when said fixed time delay has elapsed, and said step of extracting is performed responsive to said triggering signal.

22. The method of claim 18, comprising the further step of extracting data processing information associated with said data packet, prior to said step of transmitting, said step of extracting data processing information being performed by use of an access point reference in additional information, wherein, said request is prepared according to said data processing information, and said step of merging is performed according to said data processing information.

23. The method of claim 22, wherein, said step of extracting data processing information further comprises the steps of: a) extracting, from said access point reference, a driver identifier, and b) looking up said driver identifier in a driver table, said driver identifier being associated with data processing information in said driver table.

* * * * *

UNITED STATES PATENT AND TRADEMARK OFFICE
CERTIFICATE OF CORRECTION

PATENT NO. : 7,644,190 B2 Page 1 of 1
APPLICATION NO. : 10/521198
DATED : January 5, 2010
INVENTOR(S) : Stromqvist et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Twenty-first Day of December, 2010

David J. Kappos
*Director of the United States Patent and Trademark Office*